United States Patent
Watanabe

[19]

[11] Patent Number: 6,016,824
[45] Date of Patent: Jan. 25, 2000

[54] CONTROL METHOD AND CIRCUIT FOR VALVE DEVICE

[75] Inventor: Tadao Watanabe, Ibaraki-ken, Japan

[73] Assignee: SMC Kabushiki Kaisha, Tokyo, Japan

[21] Appl. No.: 09/109,065

[22] Filed: Jul. 2, 1998

[30] Foreign Application Priority Data

Jul. 9, 1997 [JP] Japan ..................................... 9-183905

[51] Int. Cl.[7] ............................ F16K 31/126; G05D 7/06
[52] U.S. Cl. .................................. 137/1; 137/486; 251/11; 60/530
[58] Field of Search ................................ 251/11, 129.05; 137/1, 486; 60/530

[56] References Cited

U.S. PATENT DOCUMENTS

| | | | |
|---|---|---|---|
| 3,860,169 | 1/1975 | Norman | 251/11 X |
| 4,347,976 | 9/1982 | Jakobsen | 251/11 X |
| 4,475,686 | 10/1984 | Huelle et al. | 251/11 X |
| 4,821,997 | 4/1989 | Zdeblick | 251/11 |
| 4,877,051 | 10/1989 | Day | 137/486 |
| 5,190,068 | 3/1993 | Philbin | 137/486 X |
| 5,463,876 | 11/1995 | Bessler et al. | 251/129.05 X |

*Primary Examiner*—Kevin Lee
*Attorney, Agent, or Firm*—Oblon, Spivak, McClelland, Maier & Neustadt, P.C.

[57] ABSTRACT

An analog voltage signal $V_A$ generated from a command signal generating device is converted to a PWM signal $V_B$ by a converter, and a drive transistor is ON/OFF controlled by the PWM signal $V_B$, whereby a current is conducted to a heater. When the heater is heated, a fluid filling a chamber of the valve device is caused to expand, whereby a membrane approaches a nozzle and a flow amount of pressurized air introduced to the valve device is restricted. As a result, energy consumed by the drive transistor is reduced and energy efficiency is improved. Further, because the generated heat from the drive transistor is small, the fluid is not affected thereby and raised in temperature by the transistor heat, whereby the flow amount characteristics of the valve device can be controlled in a stable fashion.

5 Claims, 5 Drawing Sheets

CONTROL METHOD AND CIRCUIT FOR VALVE DEVICE

BACKGROUND OF THE INVENTION

1. Field of the Invention

The present invention concerns a control method and circuitry for regulating a flow amount of a pressurized fluid by expansion and contraction of a fluid which fills a chamber, by means of a heat generating body, and by displacement thereby of a membrane constituting part of the chamber.

2. Description of the Related Art

FIG. 4 shows a valve device 10 which is used for controlling a flow amount of a pressurized fluid, such as compressed air, in an electrical signal—air pressure conversion apparatus or the like. A first wafer 16, formed by a single crystal silicon or similar glass material, is disposed inside of a casing 14 affixed to a substrate 12 in the valve device 10, and a hole 18 which communicates with an inlet conduit 20 is defined in a lower part of the first wafer 16. A nozzle 22 is formed at an opening of the hole 18 in the first wafer 16, wherein a small diameter discharge hole 24 is defined in the nozzle 22. Around the periphery of the nozzle 22, a discharge chamber 26 is defined.

A second wafer 30 is affixed to an upper surface of the first wafer 16. A chamber 34, having a silicon fluid or the like filled therein, which expands by application of applied heat thereto, is defined in the second wafer 30. A thin membrane 36 is formed on a bottom of the chamber 34, the membrane 36 being disposed at a predetermined interval separation away from the nozzle 22.

A glass wafer 38 formed of a heat resistant glass is affixed to an upper surface of the second wafer 30, wherein as a result, the chamber 34 is blocked and sealed in a fluid tight manner by the glass wafer 38. On a lower part of the glass wafer 38 which constitutes an upper surface of the chamber 34, a patterned heater 40 (heat generating body) is disposed, the heater 40 being connected to a circuit element on top of the substrate 12 via unillustrated electrodes and leads. A passage 42 communicating with the discharge chamber 26 is formed in the second wafer 30 and the glass wafer 38, and a discharge conduit 44 which is disposed in the casing 14 communicates with the passage 42.

A circuit 46 for controlling the valve device 10 formed in this manner is disposed on top of the substrate 12 which, as shown in FIG. 5, forms a bridge circuit 54 made up from the heater 40 and resistors 48, 50, 52, wherein a connection point 60 of the heater 40 and resistance 48, and a connection point 62 of resistors 50 and 52, are connected to an unillustrated temperature compensation circuit. A drive transistor 56 is connected to the bridge circuit 54, with a base 56 of the drive transistor 56 being connected to a command signal generator 58.

The control method of the valve device 10 shall now be described. When an analog voltage signal which serves as a command signal from the command signal generator 58, and corresponding to a desired compressed air flow amount, is input to the base of the drive transistor 56, a current corresponding to the analog voltage signal flows from the collector of the drive transistor 56 to the heater 40 of the valve device 10. As a result, the fluid 32 becomes heated by the heater 40 and the fluid 32 expands, whereby the membrane 36 is pressed by the expanded fluid 32 and approaches the nozzle 22. Accordingly, the flow of compressed air which is outlet from the discharge hole 24 into the discharge chamber 26 is restricted, and the flow amount thereof is reduced.

As the analog voltage signal changes and the flow of current to the heater 40 is reduced, the temperature of the fluid 32 decreases and the fluid 32 contracts, whereby the membrane 36 separates away from the nozzle 22. Thus, the flow amount of compressed air outlet to the discharge chamber 26 from the discharge hole 24 increases.

If the temperature of the heater 40 becomes high and the fluid expands excessively, there is a concern that the valve device 10 may become damaged. At that point, a change in the resistance amount of the heaters is output to an unillustrated temperature compensation circuit as a voltage difference of connection points 60 and 62 of the bridge circuit 54. A command signal output from the command signal generator 58 is controlled by the temperature compensation circuit, and the current conducted to the heater 40 is restricted, wherein the temperature of the heater 40 is reduced. In this way, damage to the valve device 10 can be prevented.

Notwithstanding, in the control method and circuit of the valve device 10 according to the above conventional technique, because the drive transistor 56 is driven by an analog signal, the electrical power consumed by the drive transistor 56 is large, and further, because the heat generated by the drive transistor 56 is large, when such heat is conveyed from the transistor 56 to the valve device 10, the fluid 32 becomes heated thereby and expands, with the problem that the flow amount characteristics of the compressed air are changed.

SUMMARY OF THE INVENTION

A general object of the present invention is to provide a control method and circuit for a valve device which is capable of minimizing the consumed electrical power of a driving element and improving energy efficiency thereof, together with enabling stable control of the flow amount characteristics of the valve device.

A principal object of the present invention is to provide a control method and circuit for a valve device in which a command signal corresponding to a desired flow amount of a pressurized fluid is supplied as a PWM signal to a driving element, a driving current is conducted to a heat generating body in accordance with ON/OFF control of the driving element, thereby causing expansion and contraction of a fluid filling a chamber of the valve device under a heat generating action of the heat generating body, and controlling a flow amount of the pressurized fluid by displacement of a membrane which constitutes part of the chamber.

Another object of the present invention is to provide a control method and circuit for a valve device in which a voltage generated in accordance with conducting a driving current to the heat generating body is compared with a standard voltage, and by controlling supply and interruption of a command signal to the driving element based on the comparison result, excessive over-heating of the heat generating body can be prevented.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

Figure 1:
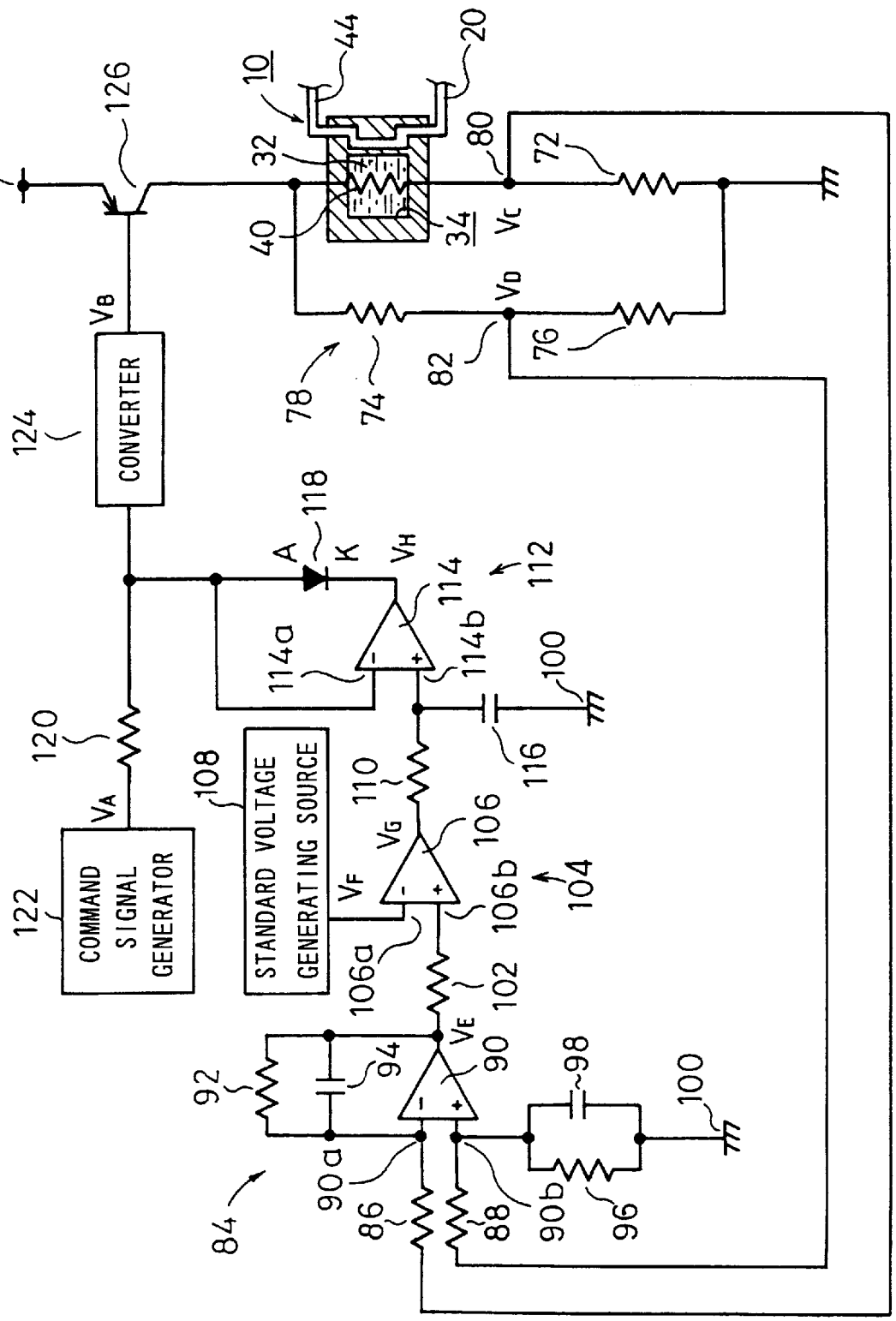
FIG. 1 is a circuit diagram showing a control circuit of a valve device according to an embodiment of the present invention.

In FIG. 1, reference numeral 70 shows a valve device according to an embodiment of the present invention. Further, the valve device 10 to which the control circuit 70 is applied is the same as that of the conventional technique shown in FIG. 4, and thus detailed explanation thereof shall be omitted.

A resistor 72 is connected in series to the heater 40 which constitutes the heat generating body of the valve device 10, wherein the heater 40 and resistor 72 are connected in parallel to resistors 74 and 76. As a result, a bridge circuit 78 is formed by the heater 40 and resistors 72, 74 and 76. The ratio of the respective resistance values of the heater 40 and resistor 72 are set the same as the respective resistance values of resistors 74 and 76.

A connection point 80 between the heater 40 and resistor 72, as well as the connection point between resistors 74 and 76, which form an output of the bridge circuit 78, are connected respectively to the inverse input terminal 90a and the non-inverse input terminal 90b of an operational amplifier 90 through resistors 86 and 88. The output of operational amplifier 90 is fed back to the inverse input terminal 90a through parallel connected resistor 92 and condenser 94. On the other hand, the non-inverse input terminal 90b is connected to ground through parallel connected resistor 96 and condenser 98. As a result, the operational amplifier 90 functions as a smoothing circuit 84 for smoothing a PWM (pulse width modulated) signal which is output through the bridge circuit 78.

The output of operational amplifier 90 is input through a resistor 102 to the non-inverse input terminal 106b of an operational amplifier 106 which constitutes a comparison circuit 104. A standard voltage generating source 108 is connected to the inverse input terminal 106a of the operational amplifier 106, wherein a standard voltage $V_F$ of a predetermined negative value is input to the inverse input terminal 106a. The output of operational amplifier 106 is connected through a resistor 110 to the non-inverse input terminal 114b of operational amplifier 114 which constitutes an interruption circuit 112. A condenser 116 is connected between the non-inverse input terminal 114b and ground 100, wherein a low pass filter is constituted by the resistor 110 and the condenser 116.

The output of operational amplifier 114 is connected to the cathode of a diode 118. The anode of the diode 118 is connected to the inverse input terminal 114a of operational amplifier 114, and through a resistor 120 is also connected to the command signal generator 122. The command signal generator 122 outputs an analog voltage signal $V_A$, wherein the analog voltage signal $V_A$ is input, through resistor 120, to a converter 124 which converts the analog voltage signal $V_A$ to a PWM signal $V_B$.

The output from the converter 124 is connected to the base of a drive transistor 126 which serves as the driving element, whereas the collector of the drive transistor 126 is connected to the heater 40 and resistor 74 of the bridge circuit 78. The emitter of the drive transistor 126 is connected to a voltage source 128.

Further, the heater 40 has a negative temperature characteristic, such that as the temperature thereof becomes higher, the resistance value of the heater 40 is lowered.

The control circuit for the valve device according to the embodiment of the present invention is basically constructed as described above. Nest, and explanation shall be given of an operation thereof.

Figure 4:
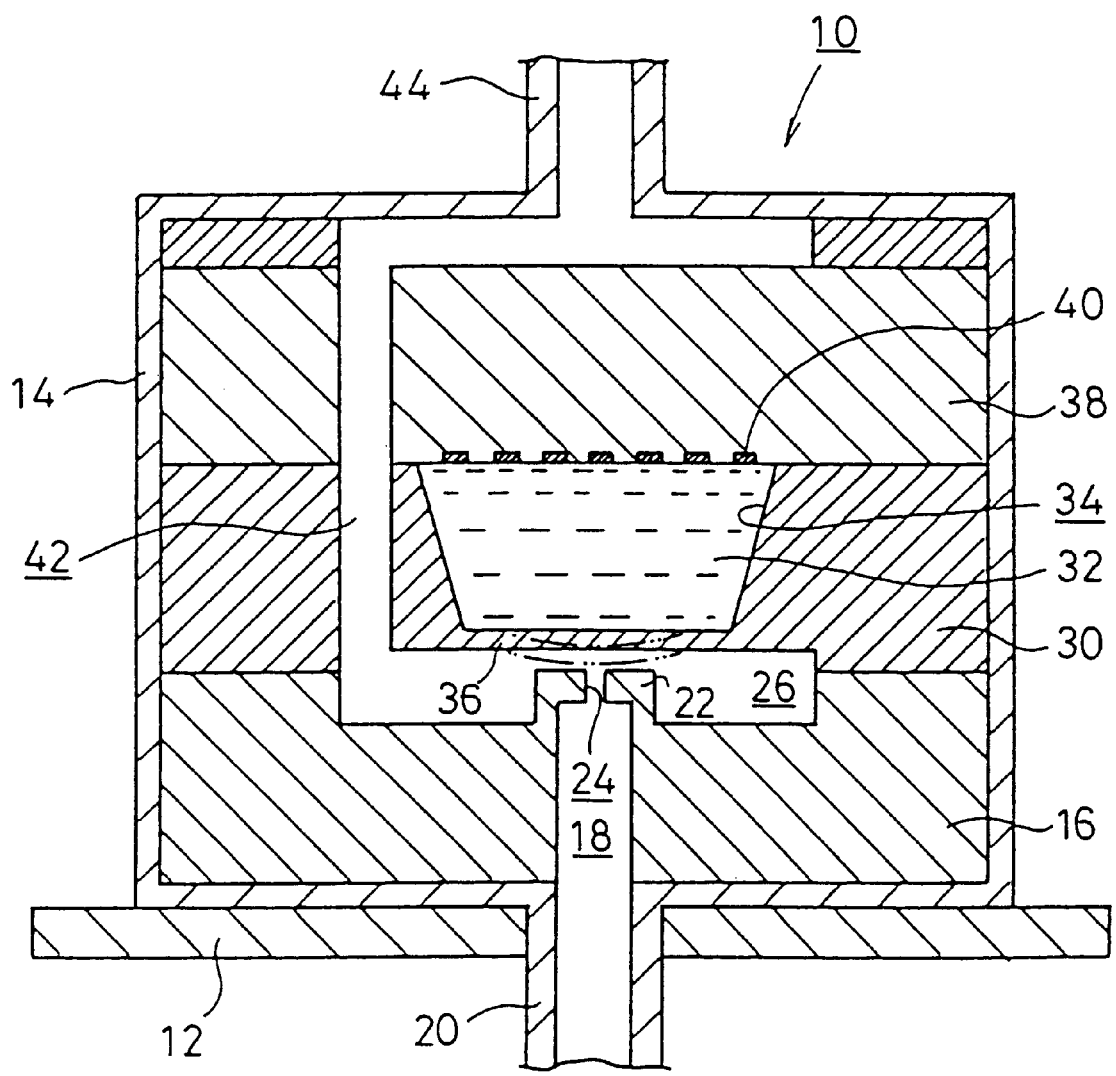
FIG. 4 is a partial vertical cross-sectional view illustrating the valve device of FIG. 1.
Figure 5:
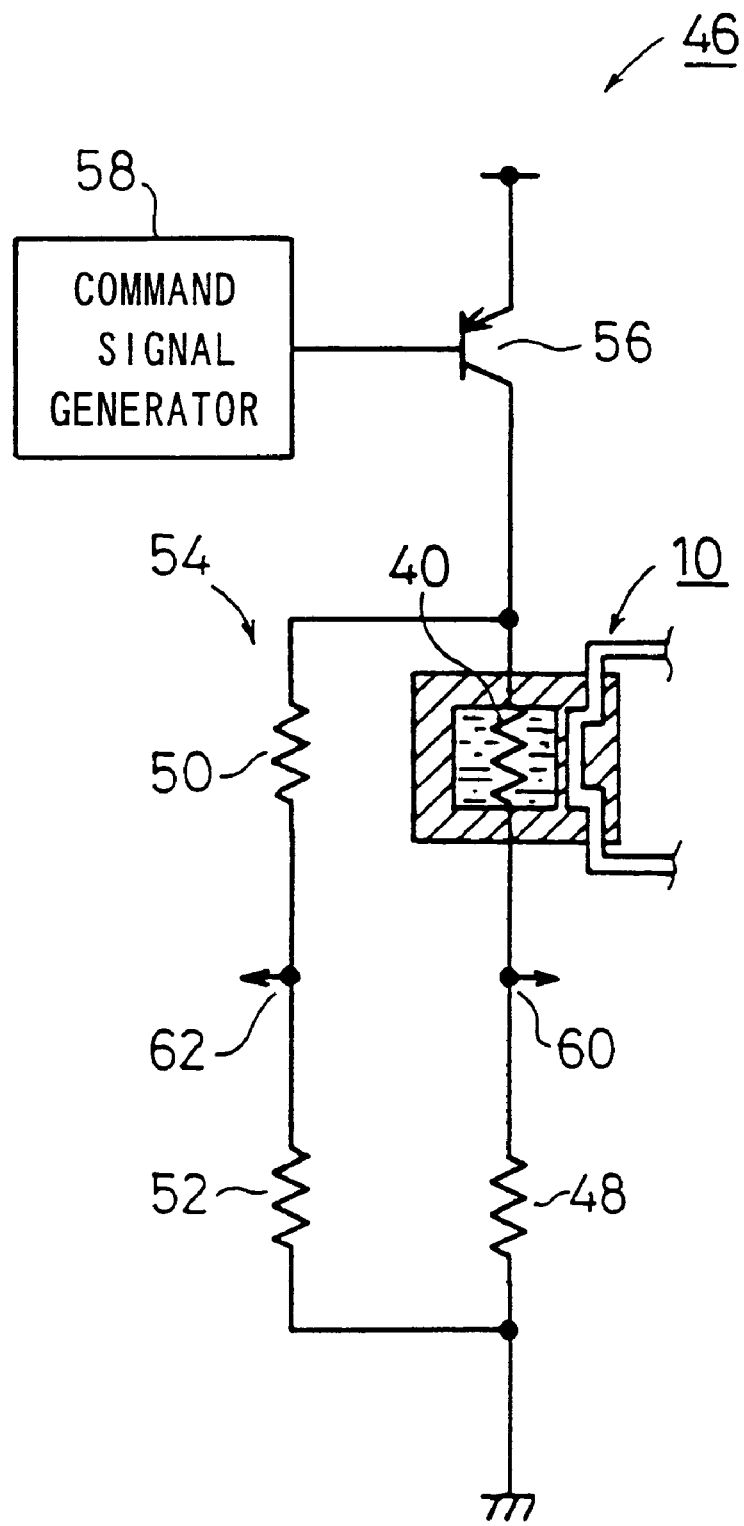
FIG. 5 is a circuit diagram showing the control circuit of a valve device in accordance with a conventional technique.

Referring to FIG. 4, when compressed air, which is an example of a pressurized fluid, is introduced to the inlet conduit 20 of the valve device 10, the compressed air is discharged through discharge conduit 44 through the discharge hole 24 of nozzle 22, the discharge chamber 26 and the passage 42.

Figure 2:
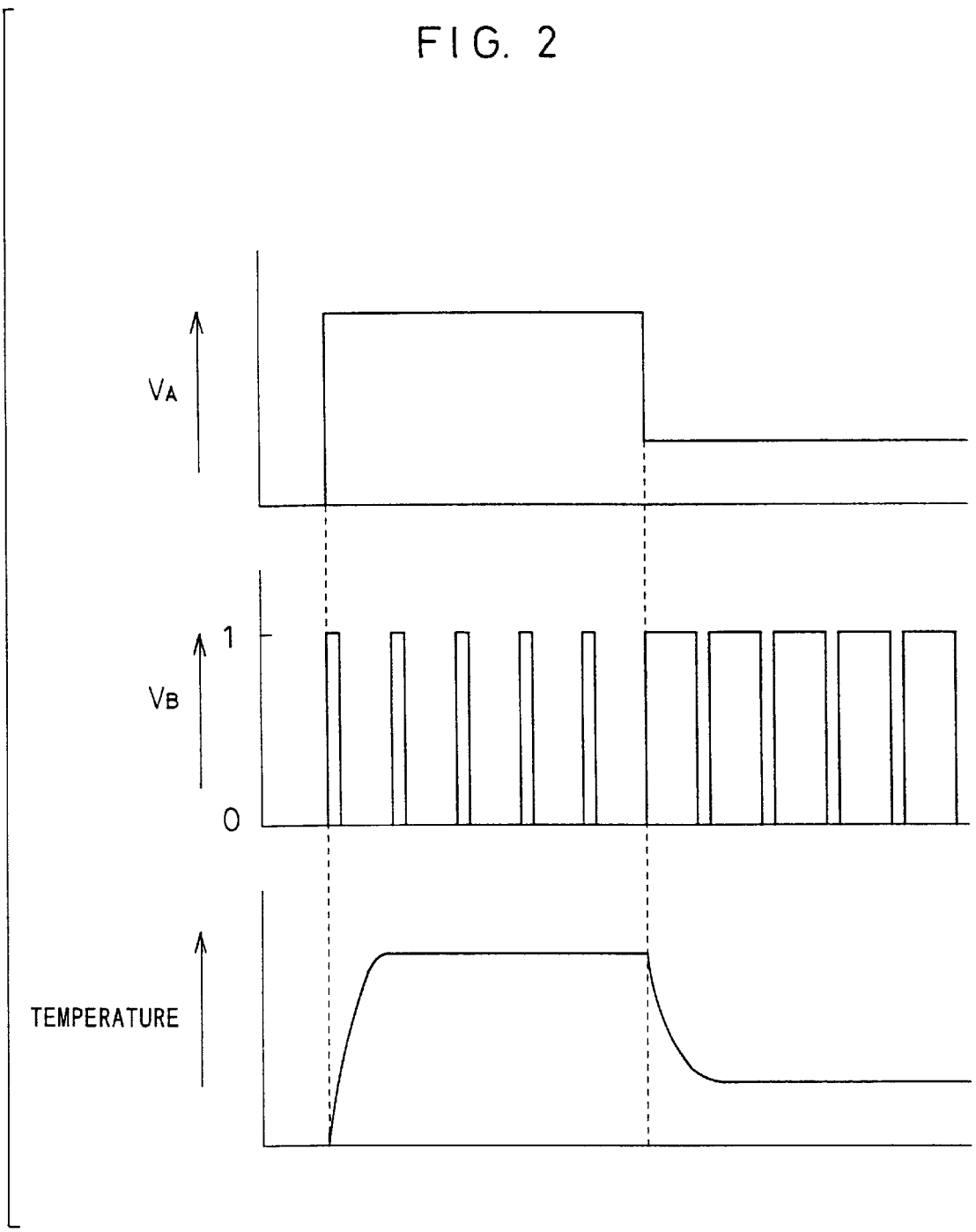
FIG. 2 is a graph showing a command signal voltage waveform of the control device of FIG. 1, a PWM signal waveform, and the temperature of the heater.

At that point, when an analog voltage signal $V_A$, which makes up a command signal corresponding to a desired flow amount of compressed air, is output from the command signal generator 122, the converter 124 generates a PWM signal $V_B$ which corresponds to the analog voltage signal $V_A$ (see FIG. 2). Such a PWM signal $V_B$ is a digital value expressed by 0 and 1. As the PWM signal $V_B$ is input to the base of the drive transistor 126, the drive transistor 126 is turned ON when the PWM $V_B$ signal is 0 and current is conducted to the heater 40 of the bridge circuit 78. On the other hand, when the PWM signal $V_B$ is 1, the drive transistor 126 is turned OFF and current is not conducted to the heater 40. Because the drive transistor 126 is repeatedly turned ON and OFF at short time intervals, when the interval at which the PWM signal $V_B$ is 0 is lengthened, the temperature of the heater 40 rises, whereas when the interval at which the PWM signal $V_B$ is 0 is shortened, the temperature 40 decreases or falls.

As the temperature of the heater 40 rises, the temperature of the fluid 32 filling the chamber 34 also rises and the fluid 32 expands, whereby the membrane 36 is pressed upon by the pressure of the expanded fluid 32, and as shown by the two-dot-chain line in FIG. 4, is displaced in a direction approaching the nozzle 22. As a result, the flow of compressed air outlet to the discharge chamber 26 from the discharge hole 24 is restricted and the flow amount thereof decreases. In this manner, as the analog voltage signal $V_A$ output from the command signal generator 122 rises, the flow amount of compressed air decreases, whereas on the other hand, as the analog voltage signal $V_A$ decreases, the flow amount of compressed air increases.

At this time, as the drive transistor 126 is switched repeatedly between ON and OFF states, electrical power consumed by the drive transistor 126 is kept small, and therefore heat generated by the drive transistor 126 also becomes extremely small. Accordingly, heat generated by the drive transistor 126 does not influence the heat of the heater 40, and high precision heat control is enabled.

Figure 3:
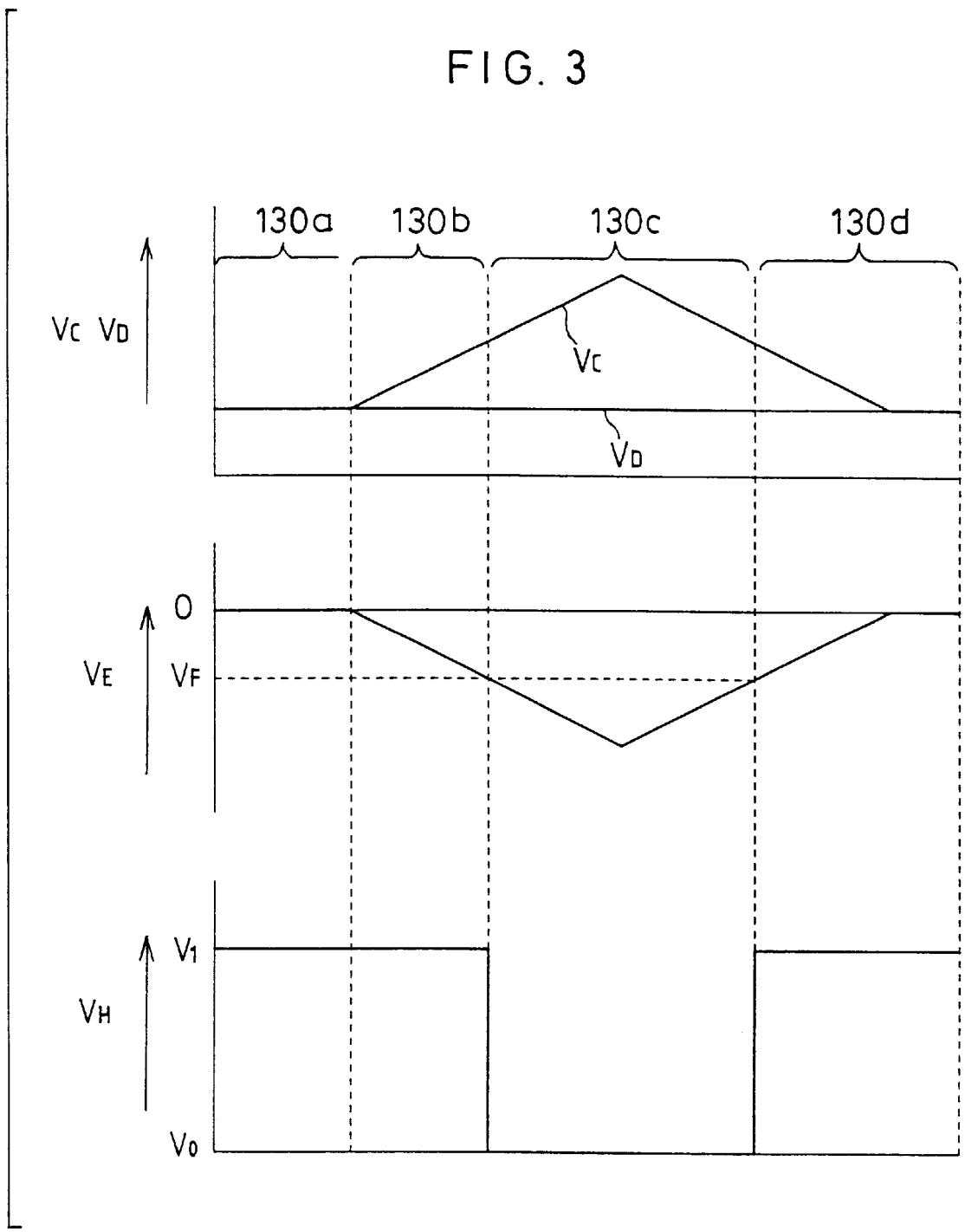
FIG. 3 is a graph showing an output signal waveform of a bridge circuit of the control device of FIG. 1, a smoothing circuit output signal waveform, and an interrupting circuit output waveform.

On the other hand, a waveform corresponding to the output of the collector of drive transistor 126 is generated at the connection points 80 and 82 of the bridge circuit 78. The smoothing circuit 84 smoothes and outputs a voltage signal $V_E$ of the difference of respective voltage signals $V_C$ and $V_D$ of the connection points 80 and 82. Because the ratio of the respective resistance values of the heater 40 and resistor 72 are set the same as the ratio of respective resistance values of resistors 74 and 76, the voltages $V_C$ and $V_D$ at connection points 80 and 82 of the bridge circuit 78 become equal at a condition in which the heater 40 is not excessively heated (region 130a of FIG. 3). As a result, the output voltage $V_E$ of the smoothing circuit 84 becomes 0 V. Hence, the output voltage $V_E$ is larger than the standard voltage $V_F$ input to the inverse input terminal 106a of operational amplifier 106 from the standard voltage generator 108, the output voltage $V_G$ of operation amplifier 106 becomes a high-level voltage $V_1$, and an output voltage $V_H$ of operational amplifier 114 of the interruption circuit 112 likewise becomes a high-level voltage $V_1$. This voltage $V_1$, is larger than the analog signal $V_A$ output from the command signal generator 122, and hence the diode 118 is put in an OFF state.

However, if the heater 40 becomes higher than a predetermined temperature, because the heater exhibits a negative temperature characteristic, the resistance value of the heater 40 decreases, and the voltage $V_C$ at connection point 80 exceeds the voltage $V_D$ at connection point 82 (region 130b). As a result, the output voltage $V_E$ of the smoothing circuit 84 is reduced. When this output voltage $V_E$ becomes smaller than the standard voltage $V_F$ output from the standard voltage generating source 108 (region 130c), an output voltage $V_G$ of the operational amplifier 106 becomes a low-level voltage $V_0$ and the output voltage $V_H$ of interruption circuit 112 likewise become a low-level voltage $V_0$. Such a voltage $V_0$ is smaller than the analog voltage signal $V_A$ output from the command signal generator 122, and hence the diode 118 is turned ON and the output voltage $V_H$, namely voltage $V_0$, is input to the converter 124. Accordingly, the analog voltage signal $V_A$ which is the command signal is interrupted. When the voltage $V_0$ is input to the converter 124, the converter 124 generates a PWM signal $V_B$ corresponding to the voltage $V_0$, namely a binary 1 signal which turns OFF the drive transistor 126, wherein current conducted to the heater 40 is interrupted. As a result, excessive heating of the heater 40 is prevented, and there is no concern of damage to the membrane 36 caused by excessive heat expansion of the fluid 32.

In addition, when the temperature of the heater 40 is once again reduced (region 130d), the output voltage $V_E$ of the smoothing circuit 84 becomes greater than the standard voltage $V_F$, and as discussed above, the output voltage $V_H$ of operational amplifier 114 of the smoothing circuit 112 becomes a high-level voltage $V_1$, wherein the analog voltage $V_A$ output from the command signal generator 122 is input to the converter 124. As a result, the heater 40 is again heated and the flow amount of compressed air is controlled.

Because the drive transistor 126 which makes up the driving element is subject to ON/OFF control by the PWM signal and a current is conducted to the heater 40 thereby in the above manner, consumed power of the drive transistor 126 becomes small and energy efficiency is improved. Further, heat generated from the drive transistor 126 becomes extremely small, so there is no fear of imparting heat to the fluid 32 of the valve device 10 as a result of the heat generated by the drive transistor 126, and hence there is no change caused thereby in the flow amount characteristics of the compressed air. As a result, a control circuit 70 for the valve device 10 having stable characteristics can be attained.

Further, the heater 40 is heated and when the output of the bridge circuit 78 which is built into the heater 40 attains a predetermined voltage, the command signal $V_A$ output from the command signal generator 122 is cut off by the interruption circuit 112, and thus excessive expansion of the fluid is prevented, alleviating any concern of damage to the valve device. Accordingly, safety of the valve device 10 can be improved.

What is claimed is:

1. A control method for a valve device for regulating a flow amount of a pressurized fluid by expansion and contraction of a fluid filling a chamber by means of a heat generating body, thereby causing displacement of a membrane which constitutes part of the chamber, comprising the steps of:

supplying a command signal $V_A$ corresponding to a desired flow amount of said pressurized fluid, as a PWM signal $V_B$, to a driving element;

conducting a driving current to said heat generating body in accordance with ON/OFF control of said driving element; and causing expansion and contraction of said fluid under a heat generating action of said heat generating body.

2. The method according to claim 1, wherein said heat generating body includes a bridge circuit built therein, further comprising the steps of:

comparing a voltage $V_E$ generated by conducting a driving current to said bridge circuit with a predetermined standard voltage $V_F$; and controlling supply and interruption of said command signal $V_A$ to said driving element in accordance with a result of the comparison.

3. The method according to claim 2, wherein output voltages $V_C$, $V_D$ of said bridge circuit are first smoothed by a smoothing circuit and then compared with said predetermined standard voltage $V_F$.

4. A control circuit for a valve device which controls a flow amount of pressurized fluid by causing expansion and contraction of a fluid filling a chamber by means of a heat generating body, thereby causing a membrane constituting part of said chamber to be displaced, the control circuit comprising:

a command signal generator generating a command signal $V_A$ corresponding to a desired flow amount of said pressurized fluid;

a converter for converting said command signal $V_A$ to a PWM signal $V_B$; and a driving element for effecting ON/OFF control of a driving current in accordance with said PWM signal $V_B$, wherein said driving current is conducted to said heat generating body, and said fluid is expanded and contracted under a heat generating action of said heat generating body.

5. The control circuit according to claim 4, further comprising:

a bridge circuit built into said heat generating body;

a smoothing circuit for smoothing output signals $V_C$, $V_D$ of the bridge circuit;

a comparison circuit for comparing an output signal $V_E$ of said smoothing circuit with a predetermined standard signal $V_F$; and an interrupting circuit for controlling supply and interruption of said command signal $V_A$ to said driving element, in accordance with an output signal $V_G$ of said comparison circuit.

* * * * *